United States Patent [19]

Asmundsson et al.

[11] 4,418,571

[45] Dec. 6, 1983

[54] LIQUID LEVEL MEASURING SYSTEM

[75] Inventors: Einar Asmundsson, Middle Haddam; Robert P. Hart, Glastonbury; Donald W. Fleischer, Wethersfield, all of Conn.

[73] Assignee: Veeder Industries, Inc., Hartford, Conn.

[21] Appl. No.: 331,993

[22] Filed: Dec. 18, 1981

Related U.S. Application Data

[62] Division of Ser. No. 181,083, Aug. 22, 1980.

[51] Int. Cl.³ ............................................. G01F 23/26
[52] U.S. Cl. .................................................. 73/304 C
[58] Field of Search ..................................... 73/304 C

[56] References Cited

U.S. PATENT DOCUMENTS

| | | | |
|---|---|---|---|
| 2,754,457 | 7/1956 | Meyers | 73/304 C X |
| 2,941,403 | 6/1960 | Steenfeld et al. | 73/304 C |
| 3,228,245 | 1/1966 | Edwards | 73/304 C |
| 4,296,472 | 10/1981 | Sarkis | 73/304 C X |

Primary Examiner—E. R. Kazenske
Assistant Examiner—Joseph W. Roskos
Attorney, Agent, or Firm—Prutzman, Kalb, Chilton & Alix

[57] ABSTRACT

A liquid level measuring device has an outer capacitance tube, an imperforate glass tube coaxially within the outer tube defining a capacitor annulus between them, and an inner capacitor sleeve coaxially within the glass tube and having separate longitudinally extending sleeve sections. The separate sleeve sections cooperate with the outer capacitance tube to form a plurality of capacitor sections each having a separately measurable value which varies between dry minimum and submerged maximum.

6 Claims, 5 Drawing Figures

LIQUID LEVEL MEASURING SYSTEM

This a division of application Ser. No. 181,083, filed Aug. 22, 1980.

DESCRIPTION

Technical Field

The present invention relates generally to liquid level measuring systems and more particularly to a new and improved liquid level measuring system having notable utility with fuel dispensing stations for measuring the level of fuel in the usual underground fuel storage tanks.

Because of the rapidly escalating cost of fuel, the value of the fuel in the usual underground fuel storage tanks of a fuel dispensing station has increased to up to $100,000 or more. Accordingly, it is becoming increasingly desirable for cost accounting purposes to maintain an accurate accounting of the amount of fuel in the underground fuel storage tanks.

Also, because of the increased value of fuel and the difficulty in determining if and when a leak occurs in an underground fuel tank, it is becoming increasingly important to carefully monitor the underground fuel storage tanks for early detection of any fuel tank leak. Early leak detection is also exceedingly important to prevent unnecessary fuel pollution and the attendant exposure to substantial liability for such pollution.

Disclosure of Invention

It is therefore a principal aim of the present invention to provide new and improved method and apparatus for accurately measuring the height of fuel in an underground fuel tank for accounting and/or leak detection purposes.

It is another aim of the present invention to provide a new and improved method of measuring the height of a liquid using a capacitance probe. In accordance with the present invention, the capacitance probe measuring system provides a highly accurate height measurement which is accurate to within one-tenth inch or less.

It is a further aim of the present invention to provide a new and improved liquid level measurement probe which is useful in measuring the level of a liquid fuel and which provides for reducing the effect of any water or other liquid entrained in the fuel.

It is still further aim of the present invention to provide a new and improved computer based method of measuring the height and/or volume of liquid in a tank having notable utility in fuel dispensing systems for measuring the height and/or volume of fuel in one or more underground fuel storage tanks.

It is another aim of the present invention to provide new and improved computer based leak detection method and apparatus for monitoring one or more underground fuel tanks for early detection of any leaks.

Other objects will be in part obvious and in part pointed out more in detail hereinafter.

A better understanding of the invention will be obtained from the following detailed description and the accompanying drawings of illustrative applications of the invention.

BEST MODE FOR CARRYING OUT THE INVENTION

Figure 1:
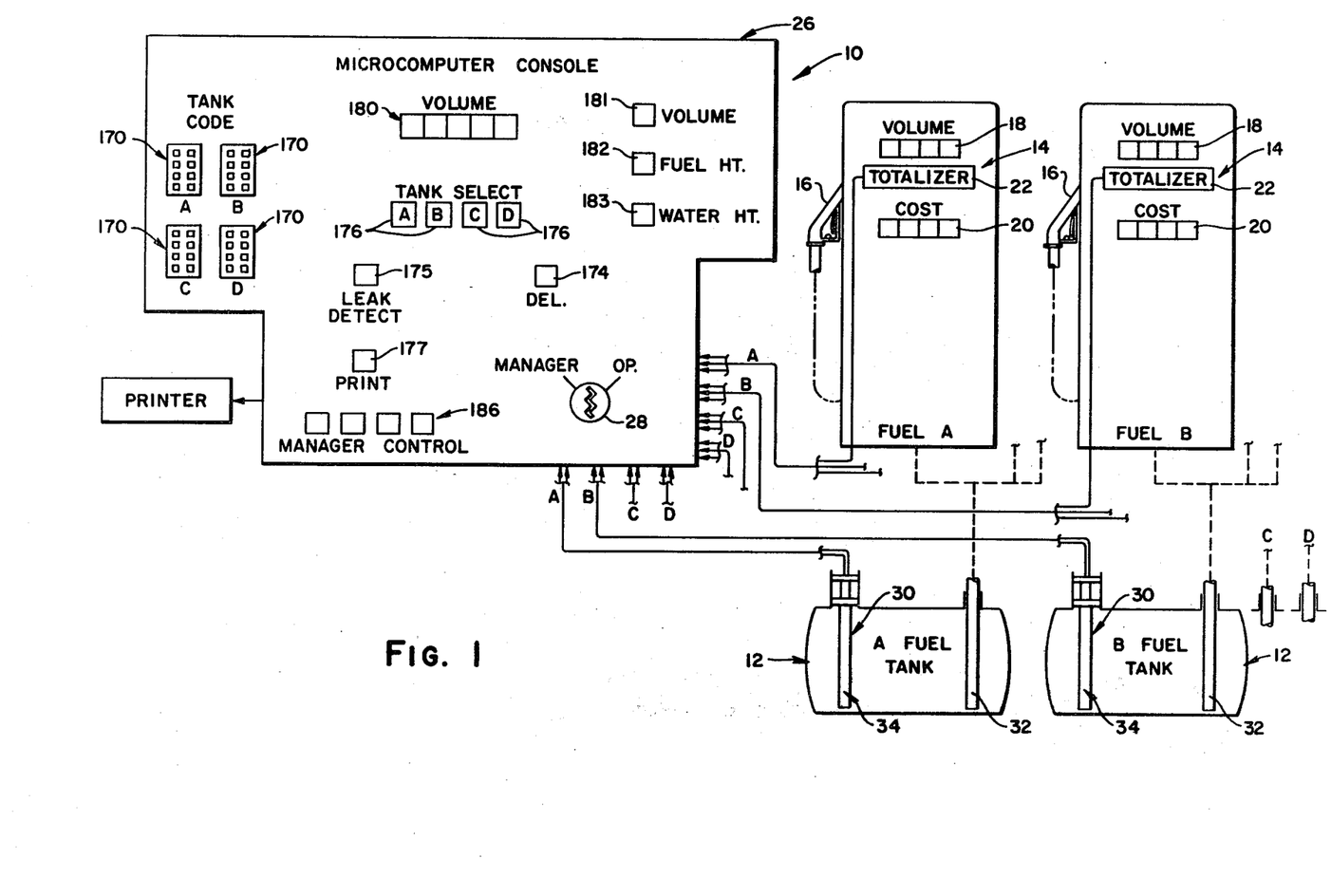
FIG. 1 is a generally diagramatic illustration, partly broken away, of a fuel dispensing station employing an embodiment of a liquid level measuring system incorporating the present invention.

Referring now to the drawings in detail wherein like numerals represent like parts throughout, an embodiment 10 of a liquid measuring system incorporating the present invention is shown employed at a fuel dispensing station having for example four underground fuel tanks 12 (only two exemplary tanks of which are shown in FIG. 1) for separate grades or types of fuel (e.g. diesel fuel and unleaded, leaded and high octane gasoline) and three fuel delivery pumps 14 (only two exemplary fuel delivery pumps of which are shown in FIG. 1) for delivering fuel from each of the four underground fuel tanks 12.

In a conventional manner, each fuel delivery pump 14 is independently operable, either by a service station attendant or by a self-service customer in the case of a self-service fuel station, for delivering fuel via a fuel delivery nozzle 16 and for registering the accumulated volume and cost amounts of fuel delivered with volume and cost counters 18, 20 respectively. Also each fuel delivery pump 14 employs a combination volume totalizer and pulse generator 22 (for example of the type shown and described in U.S. Pat. No. 4,200,785, of Alfred C. Evans et al, dated Apr. 29, 1980 and entitled "Computer Pulse Generator") which provides for registering the running total of the volume of fuel dispensed by the pump 14 and for generating an electrical pulse for each predetermined volume increment (e.g. one-tenth of a gallon) of fuel dispensed.

An electronic totalizer unit 24 (FIG. 2) has a separate tank delivery totalizer for each of the four underground tanks 12 and each tank totalizer is connected to the pump totalizers of the corresponding fuel delivery pumps 14 for accumulating the total volume of fuel delivered from the respective underground tank 12. The electronic totalizer unit 24 forms part of a control console 26 having suitable push buttons for individually resetting the tank totalizers when a key operated control switch 28 is in its "Manager" position. Accordingly, for accounting purposes the station manager can selectively reset the tank totalizers (after their totals are recorded is desired) for example at the end of each eight hour shift or other accounting period.

A vertical height measurement probe 30 is mounted within each underground tank for measuring the height of the fuel surface in the tank and also the height of the surface of any water at the bottom of the tank. As shown, each underground tank 12 is preferably slightly inclined and the height measurement probe 30 is preferably mounted at the lower end of the tank. The usual fuel outlet conduit 32 is preferably provided at the higher end of the tank so that its lower inlet end is above any water in the tank.

Figure 4:
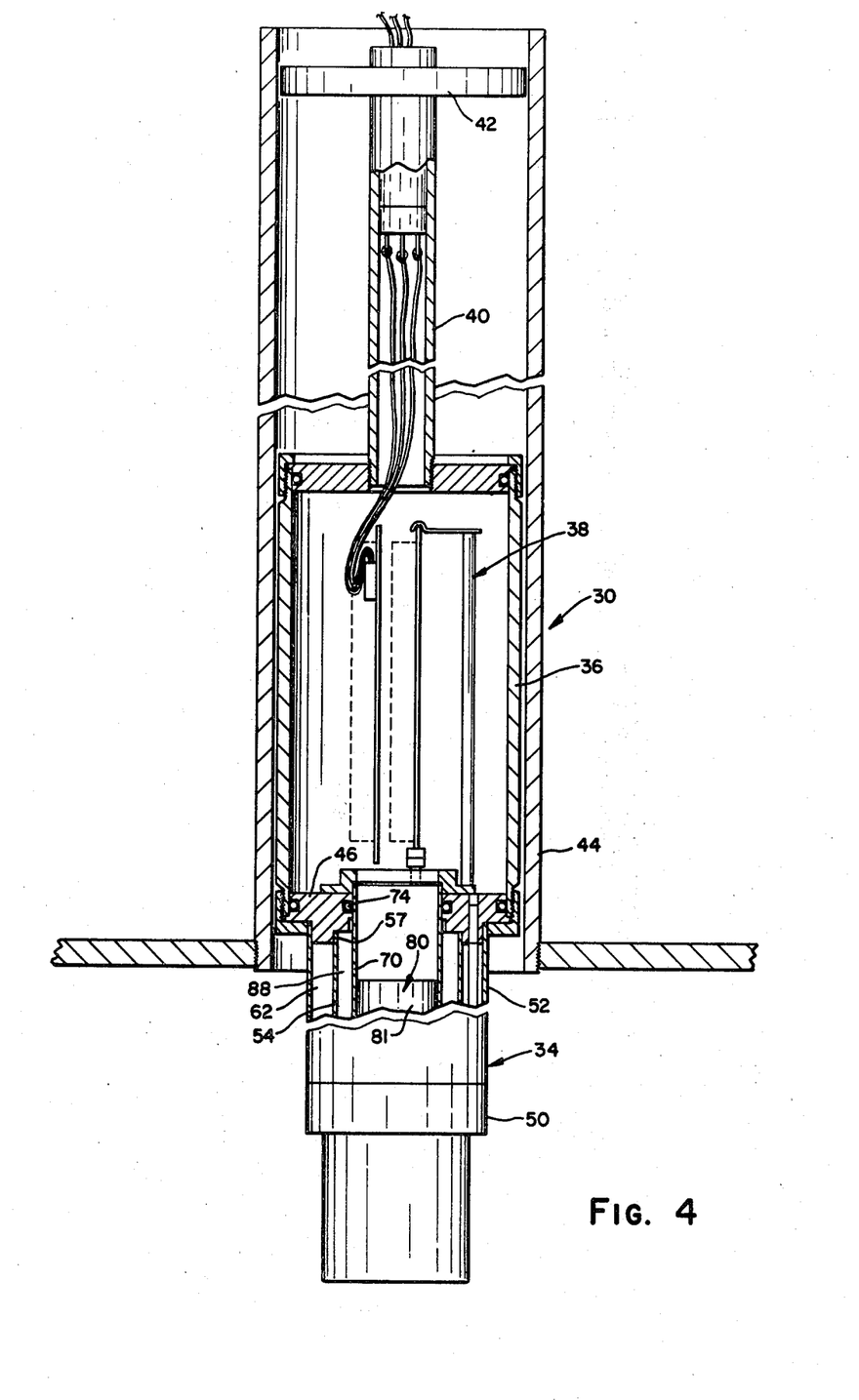
FIGS. 4 and 5 are longitudinal section views, partly broken away and partly in section, of a height measurement probe of the liquid level measuring system.
Figure 5:
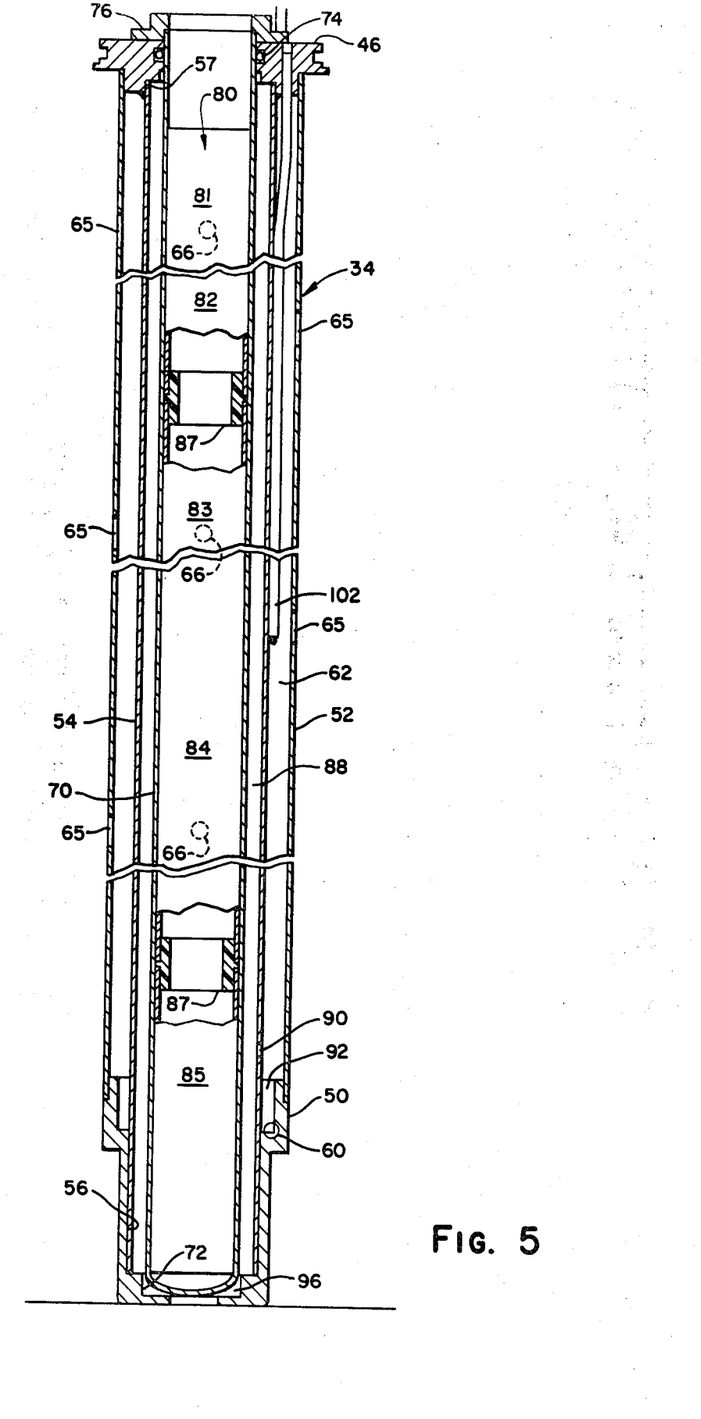

Referring particularly to FIGS. 4 and 5, each height measurement probe 30 comprises a lower elongated capacitance probe 34 extending the full height of the tank and with its lower end supported on the bottom of the tank and its upper end extending to the top of the tank. An upper coaxial cylindrical housing 36 is provided immediately above the capacitance probe for housing a probe operating circuit 38 having a pair of printed circuit (PC) boards for supporting the circuit components. An upper coaxial connector pipe 40 extending upwardly from the circuit housing provides a conduit for the leads to the probe operating circuit 38, and the upper end of the connector pipe 40 is suitably sealed to maintain the inner elongated chamber of the capacitance probe 34 and the circuit housing 36 airtight and free of liquid and foreign matter.

A cylindrical collar 42 is secured onto the upper end of the connector pipe 40 to cooperate with the circuit housing 36 for mounting the height measurement probe 30 coaxially within an upstanding fuel tank riser 44 and thereby provide for mounting the capacitance probe 34 generally vertical within the tank 12.

The capacitance probe 34 comprises an upper support collar 46 and a lower coaxial rigid plastic boot 50 integrally connected by an elongated cylindrical housing or shroud 52 made for example of aluminum. An elongated outer capacitor tube 54 is coaxially mounted within the shroud 52 and suitably secured within internal bores 56, 57 of the lower boot 50 and upper collar 46. The lower end of the outer capacitor tube 54 is for example one-half inch from the bottom of the probe and therefore also one-half inch from the bottom of the tank. A tangential inlet bore or passageway 60 is provided in the lower boot 50 at the bottom of the annulus 62 formed between the capacitor tube 54 and the outer shroud 52. The tangential inlet bore 60 provides for conducting liquid tangentially into the lower end of the annulus 62 as the tank is being filled to provide a centrifuge or separator for separating any water entrained in the fuel for example which mixes with the fuel as the tank is being filled. A 1/16th inch diameter aperture 90 is provided in the outer capacitor tube 54 approximately 5 inches from the bottom of the probe 34 for conducting fuel into and out of the lower end of the outer capacitor tube 54. Also, starting approximately twelve inches from the bottom of the probe 34, diametrically staggered ½ inch diameter and ¼ inch diameter apertures 65,66 respectively are provided every three inches along the shroud 52 and outer capacitor tube 54 respectively, for conducting fuel to and from the annulus 62 and into and out of the outer capacitor tube 54. Also, the outer capacitor tube 54 is angularly positioned so that its apertures 66 are 90° angularly offset from the apertures 65 in the shroud 52 and such that fuel is freely conducted with minimum entrained water into and out of the outer capacitor tube 54. Accordingly, when a tank 12 is partly or completely refilled with a fuel having a different dielectric constant, for example due to the usual seasonal change in fuel composition, the capacitance probe 34 will be responsive to the different dielectric constant of the new fuel composition within the tank. Also, the outer capacitor tube 54 is annodized the color black to increase the tube temperature and thereby reduce vapor condensation on the tube as well as to reduce tube corrosion.

An elongated imperforate tempered glass tube 70, for example having a 1½ inch outer diameter and a wall thickness of 0.050 inch, is mounted coaxially within the outer capacitor tube 54 with its upper end extending through the upper support collar 46 and its lower end aligned within a reduced inner bore 72 of the boot 50.

The lower end of the glass tube 70 is enclosed to prevent the entry of liquid and an O'ring seal 74 is provided in the upper support collar 46 for sealing the upper end of the glass tube. A hold down ring 76 is mounted on the upper end of the glass tube 70 and secured to the upper collar 46 to hold the glass tube 70 in position against the buoyant lifting force on the tube.

An elongated segmented inner capacitor sleeve 80 is mounted within the imperforate glass tube 70 in engagement with the tube. The inner capacitor sleeve 80 consists of five elongated sleeve segments 81–85 for example of 0.028 inch, thin gauge aluminum) and intermediate nonconductive sleeve connectors 88 made for example of plastic. The adjacent aluminum sleeve segments 81–85 are spaced for example 1/16 inch apart. The internal sleeve segments 81–85 cooperate with the outer capacitor tube 54 to provide an elongated arrangement of axially extending capacitor segments, each having a capacitance dependent upon the level and dielectric of the gas and/or liquid in the inner capacitor annulus 88 between the outer capacitor tube 54 and the internal coaxial glass tube 70. Liquid is conducted from the outer annulus 62 to the inner capacitor annulus 88 via the 1/16 inch diameter opening 90 in the capacitor tube 54 which is above the separator annulus 92 in the lower boot 50 so that entrained water is not conducted to the inner capacitor annulus 88. Also, a secondary semi-restricted liquid passageway 96 is provided between the glass tube 70 and boot 50 at the lower end of the probe to permit liquid to flow slowly into and out of the lower end of the capacitor annulus 88. The imperforate glass tube 70 provides an impermeable insulating sleeve for preventing contact of any fuel or water with the inner segmented sleeve 80.

Excepting for the bottom capacitor segment, the capacitance of each capacitor segment varies linearly between a minimum or "dry" capacitance when there is a gas dielectric in the capacitor annulus 88 (which gas dielectric is primarily fuel vapor) and a maximum or "wet" capacitance provided by a liquid fuel dielectric completely filling the capacitor annulus 88 along the full length of the capacitor segment (and extending above the capacitor segment for example one-half inch or more to overcome any fringe capacitance effect).

As is well known, if the "dry" capacitance and "wet" capacitance are known, the actual height of fuel between the lower and upper ends of a capacitor segment can be calculated from the measured capacitance of the capacitor segment in accordance with a linear relationship of the measured capacitance to the known "dry" and "wet" capacitance values. For that purpose, each of the inner sleeve segments 81–85 are independently connected to measure the capacitance of the respective capacitor segments and thereby determine the height of fuel within the tank.

The lowest capacitor segment is also employed to measure the level of any water at the bottom of the underground tank 12. Since the capacitance of the lowest capacitor segment is substantially increased by water in the capacitor annulus 88 (due primarily to the conductivity of water and its effective reduction of the dielectric gap), the height of water can be determined in the same way as the height of fuel using a known minimum capacitance value for the capacitor segment when it is submerged in a fuel dielectric and a known maximum capacitor value when it is submerged in water. In calculating the water level height with the lowest capacitor segment, it is assumed that the lowest segment is submerged in fuel above the level of water where the measured capacitance of the lowest segment is more than the capacitance value of the segment fully submerged in fuel alone.

The number of capacitor segments provided in the capacitance probe 34 is dependent upon the height of the underground tank 12. For example in a tank which is eight feet or nine feet in diameter, the capacitance probe 34 would have five capacitor segments 81-85 as described. The lowest capacitor segment 85 is primarily useful in measuring the height of water and is preferably relatively short (for example six inches long) but in any event sufficiently long to extend above any water in the tank. Also, the lower end of the lowest capacitor segment 85 is aligned with the lower end of the outer capacitor tube 54. The next three capacitor segments 82-84 are for example approximately 25¾ inches long in an eight foot probe and 29¾ inches long in a nine foot probe. The top segment 81 is made relatively short and for example is approximately twelve inches long.

Figure 3:
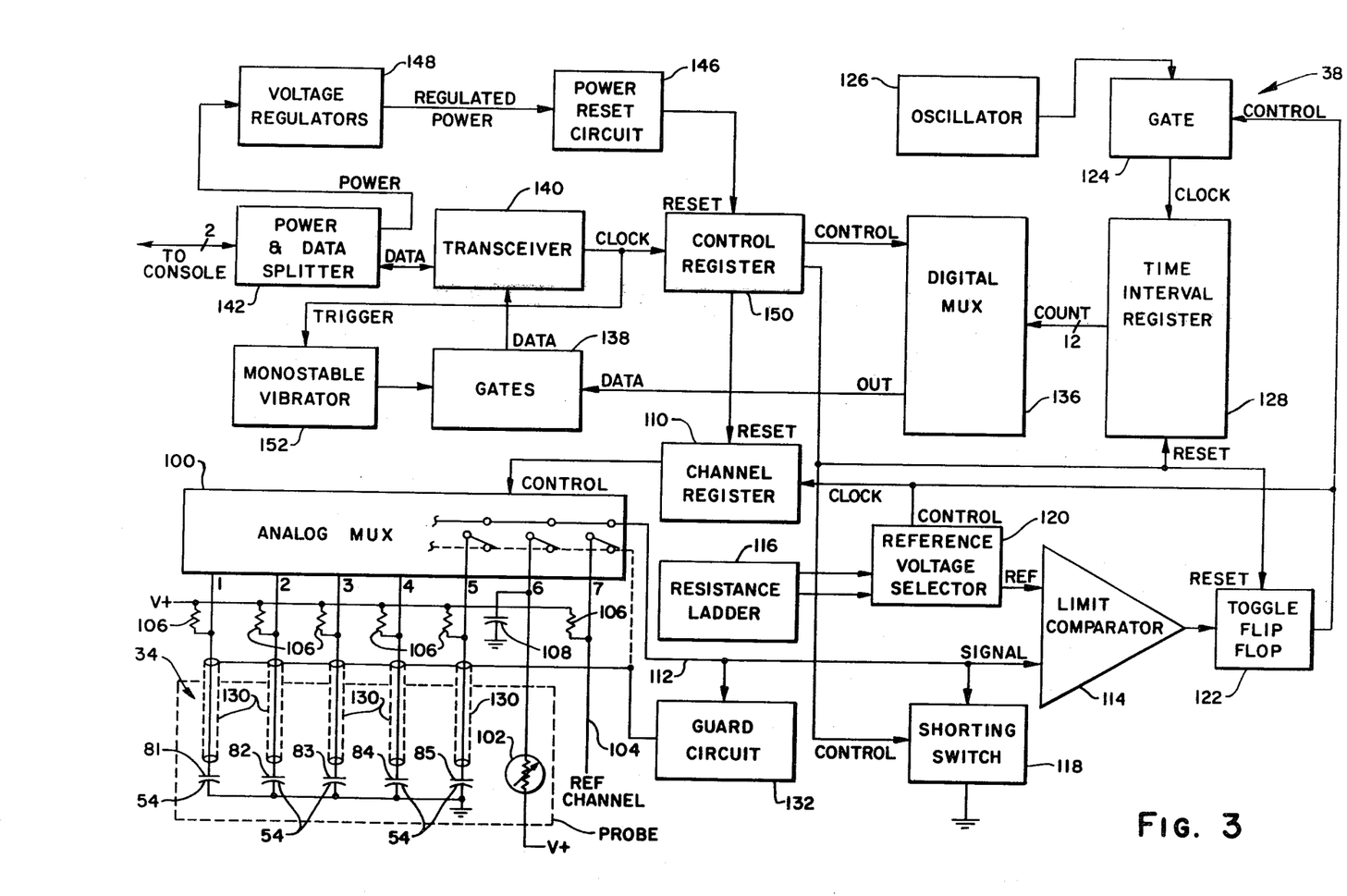
FIG. 3 is a generally diagramatic illustration of a height measurement probe operating circuit of the liquid level measuring system.

Referring to FIG. 3, a block diagram of the probe operating circuit 38 is shown for a probe having five capacitor segments and with each probe segment being connected to an analog multiplexor (MUX) 100 of the probe operating circuit. The outer capacitor tube 54 is connected to circuit ground and for simplicity of understanding is diagrammatically shown having a separate segment for each capacitor segment. Also, a suitable thermistor 102 connected to the analog MUX 100 is mounted between the outer capacitor tube 54 and outer shroud 52 as shown in FIG. 5, for example two feet from the bottom of the probe 34, for reading the temperature of the fuel in the tank 12. The measured thermistor resistance is used to calculate the fuel temperature and to calculate a temperature compensated fuel volume from the fuel volume determined from the measured fuel level.

The analog MUX 100 is also connected to an offset reference channel 104 to determine a capacitance offset due to the stray capacitance of the circuit and used for correcting the measured capacitance value of each probe segment and the measured resistance value of the thermistor.

A predetermined V+ voltage of for example 5 volts is continuously applied to each segment 81-85 of the five elongated capacitor segments and to the reference channel 104 via resistors 106 having the same known precise resistance to provide RC circuits for measuring the capacitance of each of those circuits. The V+ reference voltage is also applied to the thermistor 102 and a suitable capacitor 108 is connected to the thermistor lead to provide an RC circuit for measuring the resistance of the thermistor 102. A capacitor is not employed in the reference channel circuit because that circuit is provided for measuring only the stray capacitance for correcting each probe segment measurement.

The analog MUX 100 is indexed by a channel register 110 to connect the seven input channels in sequence to the MUX output 112. Each MUX input channel is thereby individually connected to a limit comparator 114 for comparing the channel voltage to each of the two predetermined voltages levels established by a suitable resistance ladder 116. After each channel is selected, the channel voltage is first grounded by a shorting switch 118. The shorting switch is then opened to permit the channel voltage to increase to the V+ voltage level for measuring the circuit capacitance or resistance as the case may be. A reference voltage selector 120 initially applies the lower reference voltage to the comparator 114 and the comparator 114 is connected via a toggle flip-flop 122 to switch the reference voltage selector 120 to apply the higher reference voltage when the channel voltage is equal to the lower reference voltage. At the same time, the toggle flip-flop 122 operates a gate 124 to connect a 20 megahertz oscillator 126 for indexing a time interval register 128. When the channel voltage is equal to the second reference voltage level, the toggle flip-flop 122 is switched to disconnect the oscillator 126 from the time interval register 128 so that the accumulated count stored in the time interval register 128 represents the time period for the channel voltage to increase from the first predetermined lower voltage level to the second predetermined higher voltage level of for example +0.7 and +2.5 volts respectively. The toggle flip-flop 122 also switches the reference voltage selector 120 back to its first lower voltage select position and indexes the channel register 110 to connect the succeeding MUX input channel to the MUX output 112. In that manner the seven channels are selectively activated to measure the differential voltage time factor of each channel.

The capacitor segment leads are shown as shielded leads with their outer shields 130 connected to a suitable guard circuit 132 so that the outer shields are grounded when each selected MUX input channel is connected to ground by the shorting switch 118. Alternatively, as shown in broken lines in FIG. 3, the analog MUX 100 preferably provides for connecting all of the inactive capacitor segments to the guard circuit. Thus, the guard circuit provides for connecting the shields or inactive segments as the case may be so that their voltage remains the same as the voltage in the MUX output 112 as the active channel voltage increases from ground through the lower and upper reference voltages to V+. The guard circuit thereby eliminates any stray probe capacitance which would alter the capacitance measurement of the active capacitor segment.

The time interval count in the time interval register 128 is transmitted via a digital multiplexor (MUX) 136 and suitable gates 138 to a transceiver 140 for transmission of the time data via an input power and data splitter 142 to a control console microcomputer 144. Two leads are employed for connecting the power and data splitter 142 to the console for supplying power to the probe circuit 38 and for transmitting time interval data to the console.

When the console applies power to the probe operating circuit 38 at the beginning of a probe segment scan a power reset circuit 146 is operated via voltage regulators 148 to reset a control register 150 which, in turn, resets the channel register 110 to its first channel. A succeeding digital pulse of a four pulse segment operating cycle from the console clocks the control register 150 to ground the active channel with the shorting switch 118 and to reset the toggle flip-flop 122 and time interval register 128. The next digital pulse of the four pulse cycle opens the shorting switch 118 to start the differential time measurement cycle. The third pulse of the four pulse cycle loads the time interval measurement from the time register 128 into the digital MUX 136 and the fourth cycle pulse triggers a monostable vibrator 152 for transmitting the time data serially from the digital MUX to the console.

The seven probe channels are activated in sequence as described to transmit the measured time interval data of each channel to the console microcomputer 144.

After the time data is taken for the seven channels of one probe, the microcomputer 144 switches to a succeeding probe. An entire four probe scan is completed every one-half second and the scan is then repeated so that each channel of each probe is measured every one-half second.

Figure 2:
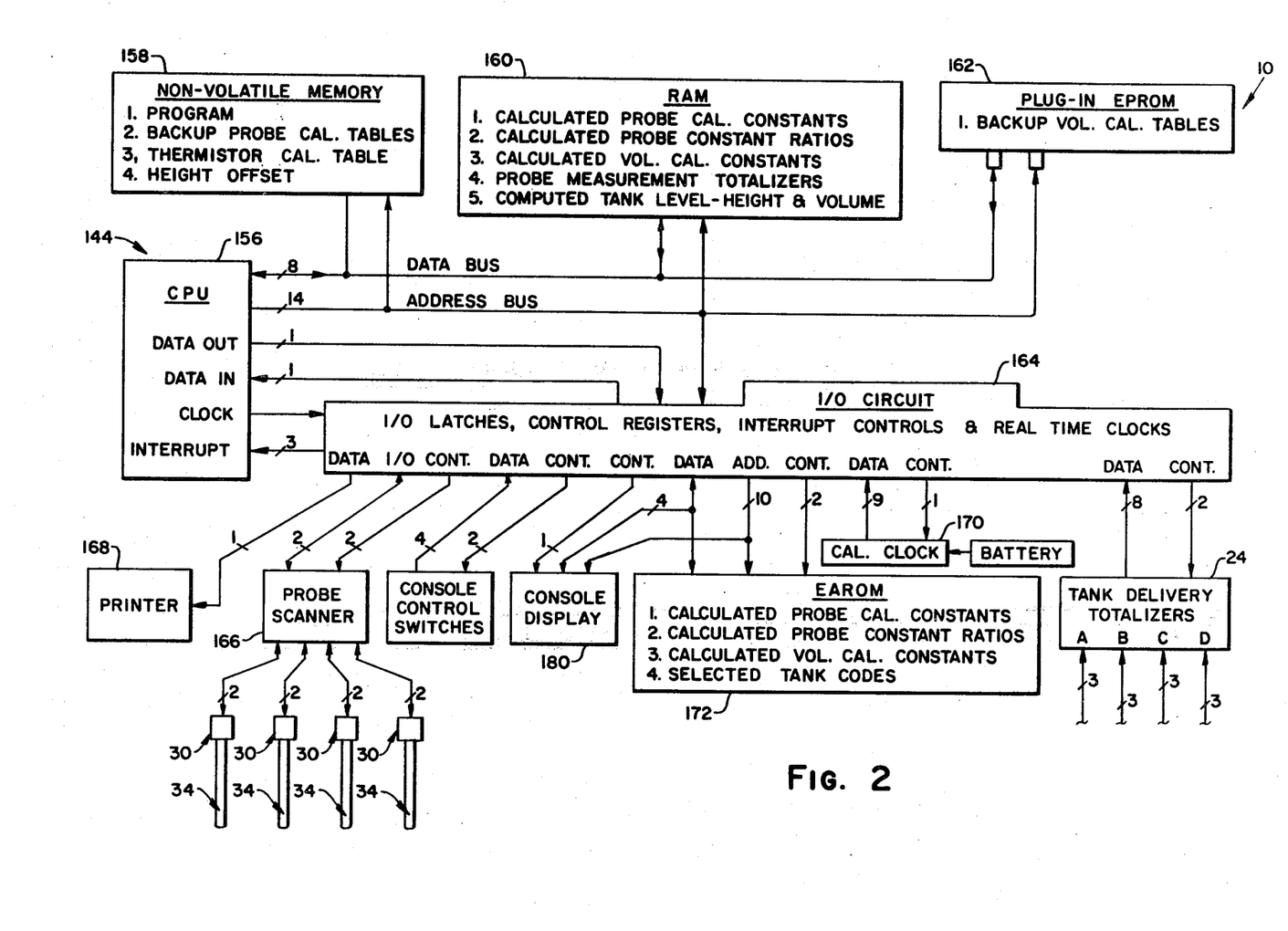
FIG. 2 is a generally diagramatic illustration of the liquid level measuring system.

Referring to FIG. 2, the console microcomputer 144 comprises a CPU 156, a suitable nonvolatile memory 158, a RAM 160, a plug-in EPROM 162 and an input-/output (I/O) circuit 164 having suitable I/O latches, control registers, interrupt controls and real time clocks for connecting the CPU 156 with other components of the microcomputer 144 and for connecting the microcomputer 144 with the rest of the liquid measurement system 10. More specifically, the I/O circuit 164 is connected via I/O and control leads to a probe scanner 166 which in turn is connected by I/O leads to each of the four probes 30 of the four probe liquid measurement system. The I/O circuit is also connected by control and data leads to the volume totalizer unit 24 provided for accumulating a running total of the amount of fuel delivered from each of the four underground tanks 12.

A suitable readout printer 168 having its own microprocessor based control circuit is connected by a data lead to the I/O circuit 164 for transmitting data serially to the printer. For example, in a normal or delivery mode of operation of the liquid measurement system 10, the console is manually operable to printout for a selected tank the (a) time and date; (b) total volume of fuel (in gallons and liters) remaining in the tank; (c) temperature compensated volume of fuel (in gallons and liters) remaining in the tank; (d) height of fuel in the tank in inches; (e) height of water in the tank in inches; and (f) temperature of the fuel in the tank in degrees Celsuis. Also, in a leak detect mode principally used at night and other times when the fuel dispensing system is not in use, the liquid measurement system 10 automatically provides (a) when the leak test is initiated and when it is either manually or automatically terminated, a printout of the time and date and the temperature of fuel in each tank, and (b) at the end of each sixty minute interval during the leak test, a printout of the incremental volume change in each tank since the last printout.

A suitable calendar clock 170 having a battery backup is connected via control and data leads to the I/O circuit 164 to provide a time and date input for use in printing out the time and date in both the leak detect and delivery modes.

The various control switches of the microcomputer console are connected via data and control leads to the I/O circuit 164. Included are a bank 170 of eight binary control switches (FIG. 1) for each underground tank for entering the length of the tank and the nominal diameter of the tank (and therefore also the length and type of capacitance probe employed). The tank code switches are operable to select the tank code only when the key-operated console switch 28 is in the "Manager" position and the selected tank code for each tank is then stored in an EAROM 172 connected to the I/O circuit 164. In addition to the four tank code switch banks 170, the console has delivery and leak detect mode select push button switches 174, 175 respectively, four tank select push button switches 176 for the four underground tanks, a print push button switch 177 for operating the printer to print the amount shown by a five digit LED display 180 of the console, and volume, fuel height and water height push button switches 181-183 respectively, operable for registering with the LED display 180, the volume of fuel and the fuel and water heights respectively in the selected tank. Also, a bank 186 of control switches are provided for use in the "Manager" mode for reading and/or printing out the "wet" and "dry" capacitance constants of each capacitor section of each tank 12, the "wet" constant ratios and the measured capacitance of each capacitor section of each tank 12 and for resetting the calendar clock 170.

The EAROM 172 and the five digit LED console display 180 are connected to the I/O circuit 164 via data, address and control leads for transmitting data to the display 180 and EAROM 172 and for receiving data from the EAROM 172. In that regard, the EAROM 172 is provided for storing certain data against loss if there is a microcomputer power loss. As previously indicated, the selected tank code for each tank is stored in the EAROM. Also, although backup dry and wet calibration tables for all of the available probe lengths are preloaded in the nonvolatile memory 158, updated or calculated "wet" and "dry" calibration constants for each segment of each probe of the four probe system (determined as hereinafter described during the operation of the system) are stored in the EAROM for protection against a power loss and also in the RAM 160 for future use in computing the height of fuel in each tank. Similarly, although backup volume calibration tables for all of the normally available tank diameters and lengths are preloaded in the plug-in EPROM 162, updated or calculated volume calibration constants for each of the four underground tanks 12 of the system (which are determined as hereinafter described during the operation of the system) are stored in the EAROM 172 for protection against a power loss.

The backup volume tables preloaded in the plug-in EPROM 162 comprise a table for each of the available tank codes giving the nominal volume (e.g. in gallons) of the tank at each of sixteen levels or heights within the tank and suitably predetermined from the nominal length and diameter of the tank under the assumption that the tank is buried in the ground with its main axis level. The backup gallon tables are then used in conjunction with the height measurements provided by each probe to determine the volume of fuel within the tank, interpolating or calculating the incremental volume between the calibration levels given in the backup volume tables using the nominal diameter of the underground tank. In addition, since the system maintains a running total of the amount of fuel delivered from each tank 12 with the four tank totalizers, volume calibration data is computed by the microcomputer 144 for each tank for example for the same sixteen calibration levels given in the backup volume tables. The updated volume calibration data is then stored in the EAROM 172 as indicated and also in the RAM for future use in computing the fuel volume in the tank.

The backup "wet" and "dry" constants for each capacitor segment stored in the nonvolatile memory 158 are used until "wet" and "dry" calibration constants can be calculated for that capacitor segment. Likewise, the backup volume calibration constant for each fuel tank calibration level stored in the EPROM is used until the volume calibration constant for that calibrated level can be determined using the delivery data stored in the corresponding tank delivery totalizer. In that regard, each tank delivery totalizer provides in combination with the fuel height measurement system for automatically determining the incremental tank volume between calibration levels and eventually for determining the actual volume at each calibration level and total volume of the tank exclusive of the tank volume of the lowest water height capacitor segment.

As previously described, each capacitor segment of each of the four probes 30 is scanned every one-half second. The measurements taken during each four probe scan are averaged by a method which reduces the RAM requirements and which avoids abrupt changes in the average measurements used to calculate the fuel height more particularly, the RAM 160 has ten totalizers for (a) each capacitor segment of each probe, (b) each probe reference channel and (c) each probe thermistor (and therefore a total of 280 totalizers for the four probe seven channel system described). Each time measurement (which has a direct linear relationship to the capacitance or resistance being measured) is added to each totalizer of the respective bank of ten totalizers. For height measurements in the delivery mode, each totalizer is operated to accumulate fifty successive time measurements (or in effect capacitance or resistance measurements as the case may be) and is then reset to zero to accumulate the succeeding fifty measurements. The ten totalizers of each bank are reset at equally spaced intervals (i.e., at five measurement intervals where each totalizer is reset after accumulating fifty measurements as described). When a height calculation is determined, the appropriate totalizers having the largest numbers of accumulated measurements are employed for calculating the height of liquid within the tank. Those totalizers will have between 46-50 accumulated measurements and the average measurement of each totalizer is then determined by dividing the accumulated total by the number of measurements. The average measurement of the interface capacitor segment and offset channel are then employed for computing the liquid surface height from the stored "wet" and "dry" constants for that capacitor segment (and for simplicity in calculating the liquid surface height the "wet" and "dry" constants stored in memory use the same units of measurement as the time measurements).

Likewise, the fuel temperature is computed from the average time measurements of the thermistor and reference channel totalizers having the largest number of time measurements in conjunction with a thermistor calibration table stored in the nonvolatile memory 158.

Thus, the calculated fuel surface height and fuel temperature are automatically and accurately determined by the microcomputer 114 from an average of 46-50 measurements taken over a period of 23-25 seconds and so that the average measurements are not distorted by any wave action within the tank or other variables which would affect the accuracy of the measurements.

Accordingly, it has been found that the surface height of the fuel (and to a lesser extent the surface height of any water) in the tank can be calculated within an accuracy of about one-tenth inch and the fuel volume exclusive of the lowest water capacitor segment volume can be calculated within an accuracy of about 2/10%.

In the leak detect mode of the system, the height and volume calculations are employed to determine if any fuel is leaking from the tank. The leak detect mode is designed to be used when fuel is not being delivered from the tank, for example at night or other times when the fuel dispensing station is not in operation, so that any substantial decrease in the fuel volume (or the temperature compensated fuel volume) is attributable to a leak or theft. In that regard, a fuel tank leak is becoming an increasingly greater problem because of the (a) difficulty in detecting an underground leak, (b) substantial potential economic loss and (c) pollution problems and attendant financial risk created by a leak. Thus, the leak detect system is particularly useful in providing an early warning of any underground tank leak for replacement or repair of the tank 12 before the leak increases to the point of being a very significant problem.

In the leak detect mode, fuel height measurements are calculated substantially more accurately than in the delivery mode in that 5,000 time measurements for each probe channel are accumulated in each of the ten respective totalizers for calculating the fuel and water heights instead of the fifty measurements used to calculate fuel and water heights in the delivery mode. The totalizers of each bank of ten totalizers for each capacitor segment are reset at equal intervals of 500 measurements so that the totalizer of each bank having the largest number of measurements will have between 4,501 and 5,000 accumulated measurements for determining the average measurement.

In the leak detect mode, the microcomputer 144 automatically provides a printout every sixty minutes of any change in the fuel volume of each of the four tanks and such that the station attendant or manager, for example each morning after the system has been operated all night in a leak detect mode, can read the hourly printouts to determine if there is any measured loss of fuel in any of the tanks during the leak detect mode of operation. It is expected that the system will be able to detect leaks greater than two or three gallons over an eight hour period by operation in the leak detect mode for that period of time every day for several days.

The "wet" and "dry" constants of each capacitor segment are directly measured by the microcomputer 144 (and then stored and used for subsequent height calculations) when it is determined from the capacitance probe readings that the segment is completely dry or wet (i.e., submerged in fuel). More particularly, when the liquid level height is calculated to be in the middle one-half of one capacitor segment, the "dry" constant of the next higher capacitor segment, if any, is determined from an average of fifty segment time readings. The measured "dry" constant of any appropriate segment is updated in that manner every sixty minutes or anytime the liquid level shifts to the middle one-half of a lower or higher capacitor segment. The "dry" constant of the lowest water height capacitor segment is measured only when the tank is substantially empty and therefore the backup "dry" constant for the lowest segment is normally used in the water height calculation.

The "wet" constant of each capacitor segment is similarly determined from an average of fifty segment time measurements and stored for future height calculation when the liquid surface level is calculated by the microcomputer to be in the middle one-half of the next higher capacitor segment, if any. For the lowest water height capacitor segment, because of the likely presence of both fuel and water, the "wet" constants for both fuel and water are taken from the tables. Also, the backup or any prior calculated "wet" constant for the highest probe segment is statistically modified to provide an updated or calculated "wet" constant when that capacitor segment height measurement is calculated to be within two inches of the top (thereby indicating that the fuel level may be at the top) using the last available "wet" constant. The "wet" constants are updated every sixty minutes or when the fuel level shifts either upwardly or downwardly to the middle one-half of another segment.

In addition to the described automatic calculation and storage of "wet" constants for the top four capacitor segments, the microcomputer 144 calculates and stores "wet" constant ratios for those capacitor segments. Thus, for example when the fuel level is calculated to be in the middle one-half of the top capacitor segment, the "wet" constant ratios of the next lower three capacitor segments are also calculated and stored in the microcomputer RAM and EAROM. The "wet" constant ratios for the top capacitor segment are updated when the "wet" constant for the top segment is updated.

The "wet" constant ratios are used by the microcomputer 144 to update the "wet" constant of the active or interface capacitor segment. In other words, because of a change in the dielectric constant of the fuel, a "wet" constant of a lower capacitor segment updated with the new dielectric constant is employed to update the "wet" constant of the active or interface segment using the appropriate previously calculated "wet" constant ratio. Accordingly, for example when the underground fuel tank 12 is partly or completely filled with fuel having a different dielectric constant which would change the "wet" constant of each probe segment, the "wet" constant of the active or interface capacitor segment is recalculated by applying the appropriate current "wet" constant ratio to the "wet" constant of a lower capacitor segment.

The active or interface capacitor segment is determined by the microcomputer 144 by comparing each offset corrected capacitor segment measurement to its respective "wet" and "dry" constants, including any recalculated "wet" constant using the last calculated "wet" constant ratio.

If the corrected measurement for any one capacitor segment is between its "wet" and "dry" constants and the corrected measurements of the adjacent higher and lower capacitor segments, if any, approximately equal their respective "dry" and "wet" constants respectively, that one capacitor segment is determined to be the active or interface segment.

The same capacitor segment is considered to be the active capacitor segment for thirty seconds and then the microcomputer 114 recalculates which capacitor segment is the active or interface segment.

The calculated height of the fuel surface determined with the capacitance probe 34 and by the microcomputer 144 as described above may be adjusted by a height offset manually determined and entered into storage in the microcomputer so that the adjusted or "corrected" height reading is substantially the same as a wet height reading provided by a suitable measurement stick. In that regard, measurement sticks are presently conventionally used to determine the wet height of fuel by inserting such a stick through a suitable tank riser (not shown) provided for that purpose. Because of tank inclination and the distance between the probe and the measuring stick riser, a substantial difference between the probe and stick readings is likely. Thus, in order to avoid any problems presented by two different height readings provided by the probe and stick, a height offset is preferably automatically applied by the microcomputer 144 so that the two different types of readings are directly comparable. Of course, the probe provides a much more accurate basis on which to determine the height of fuel within the tank.

As will be apparent to persons skilled in the art, various modifications, adaptations and variations of the foregoing specific disclosure can be made without departing from the teachings of the present invention.

We claim:

1. In a liquid level measurement device having an elongated capacitance probe with a succession of a plurality of longitudinally extending capacitor sections, each having a separately measurable capacitance value which varies between dry minimum and submerged maximum values thereof, the improvement wherein the capacitance probe comprises an outer capacitance tube, an imperforate glass tube mounted generally coaxially within the outer capacitance tube to define a capacitor annulus therebetween, and an inner capacitor sleeve mounted coaxially within the glass tube and having a succession of a plurality of separate, longitudinally extending capacitance sleeve sections cooperating with the outer capacitance tube to form said plurality of capacitor sections respectively.

2. A liquid level measurement device according to claim 1, further comprising an outer generally coaxial tubular shroud surrounding the outer capacitor tube to define a second annulus therebetween.

3. A liquid level measurement device according to claim 2, further comprising a tangential inlet opening at the lower end of the capacitance probe for conducting liquid tangentially into said second annulus to provide a centrifuge for separating any extraneous material from the liquid.

4. A liquid level measurement device according to claim 3, wherein the outer capacitor tube has an inlet opening above said tangential inlet opening for conducting liquid from said second annulus to the capacitor annulus.

5. A liquid level measurement device according to claim 2 or 3 wherein the outer tubular shroud and outer capacitor tube each have a plurality of axially spaced apertures to conduct liquid to and from said second annulus and between said second annulus and the capacitor annulus respectively.

6. A liquid level measurement device according to claim 5 wherein the axially spaced apertures in each said outer shroud and outer capacitor tube are angularly staggered and wherein the aperture in the outer capacitor tube are angularly spaced from the adjacent apertures in the outer shroud.

* * * * *